(12) United States Patent
Arya et al.

(10) Patent No.: US 6,738,231 B2
(45) Date of Patent: May 18, 2004

(54) PIEZOELECTRIC MICROACTUATOR FOR SLIDER SIDE ACTUATION

(75) Inventors: Satya P. Arya, San Jose, CA (US); Tzong-Shii Pan, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 167 days.

(21) Appl. No.: 10/131,545

(22) Filed: Apr. 24, 2002

(65) Prior Publication Data

US 2003/0202292 A1 Oct. 30, 2003

(51) Int. Cl.[7] .............................................. G11B 5/56
(52) U.S. Cl. .................................. 360/294.4; 360/245.3
(58) Field of Search ........................... 360/294.1, 294.3, 360/294.4, 245.3

(56) References Cited

U.S. PATENT DOCUMENTS

| | | | |
|---|---|---|---|
| 6,038,104 A | 3/2000 | Sato et al. | 360/106 |
| 6,046,888 A | 4/2000 | Krinke et al. | 360/109 |
| 6,115,223 A | 9/2000 | Berg et al. | 360/294.4 |
| 6,246,552 B1 * | 6/2001 | Soeno et al. | 360/294.4 |
| 6,320,730 B1 * | 11/2001 | Stefansky et al. | 360/294.4 |
| 6,381,104 B1 * | 4/2002 | Soeno et al. | 360/294.4 |
| 6,493,192 B2 * | 12/2002 | Crane et al. | 360/294.3 |
| 6,621,661 B1 * | 9/2003 | Ichikawa et al. | 360/234.5 |
| 2001/0053050 A1 * | 12/2001 | Crane et al. | 360/294.3 |
| 2002/0036870 A1 * | 3/2002 | Shiraishi et al. | 360/294.4 |
| 2002/0041462 A1 * | 4/2002 | Bonin et al. | 360/78.05 |
| 2002/0051326 A1 * | 5/2002 | Shiraisi et al. | 360/294.4 |
| 2002/0141117 A1 * | 10/2002 | Kasajima et al. | 360/294.4 |
| 2002/0154450 A1 * | 10/2002 | Kasajima et al. | 360/294.4 |
| 2002/0176212 A1 * | 11/2002 | Ota et al. | 360/294.4 |
| 2003/0001457 A1 * | 1/2003 | Wang et al. | 310/328 |
| 2003/0147181 A1 * | 8/2003 | Shiraishi et al. | 360/294.4 |

FOREIGN PATENT DOCUMENTS

| | | |
|---|---|---|
| JP | 7141815 | 6/1995 |
| JP | 11031368 | 2/1999 |
| JP | 2000163896 | 6/2000 |
| JP | 2000173202 | 6/2000 |

* cited by examiner

Primary Examiner—Jefferson Evans
(74) Attorney, Agent, or Firm—Ohlandt, Greeley, Ruggiero & Perle, L.L.P.

(57) ABSTRACT

A microactuator device for effecting fine positioning of a transducing head with respect to a selected track on a disk, wherein the piezoelectric microactuator element is positioned adjacent to one side of and substantially coextensive with a slider, the slider being attached to the moving end of a flexure, and the two ends of the microactuator element are attached to the moving end and fixed legs of the flexure and provide rotary motion.

12 Claims, 3 Drawing Sheets

PIEZOELECTRIC MICROACTUATOR FOR SLIDER SIDE ACTUATION

FIELD OF THE INVENTION

The present invention relates to disk drive systems and, more particularly, to microactuator devices that function to provide fine movements of a transducing head so that densely spaced tracks on a disk may be accurately selected and followed to read and write more data on disk.

BACKGROUND OF THE INVENTION

The present invention particularly pertains to a microactuator device for use in a multiple track disk drive system so that fine positioning of a transducing head over a selected track of the disk may be obtained, and more particularly, to a piezoelectric microactuator device that provides a simplified, low-cost construction when compared with the prior art designs.

Magnetic disk drives are information storage devices that use thin film magnetic media to store data. A typical disk drive as seen in FIG. 7 of U.S. Pat. No. 6,166,890, the disclosure of which is incorporated herein, includes one or more rotatable disks having concentric data tracks in which data is read or written. As a disk rotates, a head transducer, also referred to as a magnetic recording head, is supported by a slider and positioned by an actuator element to magnetically read data from, or write data to, various tracks on the disk. Typically, the head transducer is attached to a slider having an air-bearing surface, which is supported adjacent to a data surface comprising the data tracks by a film of air generated by the rotating disk. Suitable wires connect the transducer on the slider to a data processing unit that controls read/write electronic circuitry.

The radial spacing between data tracks continues to decrease with increase in recording density, requiring greater precision for head positioning. External and internal disturbances in a disk drive continuously move the head transducer off the data track. Conventional disk drives correct for off-track motion by actuating the arms carrying the head transducers using a voice coil motor. See the Figures of U.S. Pat. No. 6,115,223, the disclosure of which is incorporated herein by reference. However, a voice coil motor lacks fast response and sufficient resolution for small motions required to effectively maintain position of head on a track of a high-track density disk. Therefore, a secondary fast response high-resolution head positioning mechanism is necessary for small motions to reduce track registration error in high-density disk drives.

Various prior art piezoelectric microactuator designs correct for hard disk drive disk track misregistration. These include designs with piezoelectric elements mounted on arm, or on suspension near hinge, near or under the slider carrying the head transducer. Designs with piezoelectric microactuators mounted on the arm produce highest slider movement but excite undesirable voice coil motor coil, arm, and suspension load beam modes. Designs with piezoelectric microactuators mounted near the hinge produce medium slider movement but excite undesirable arm tip and suspension modes. Designs with piezoelectric microactuators mounted near the slider produce small slider movement but excite minimum undesirable modes of flexure and load beam.

Some of the currently available designs, the piezoelectric elements are placed under the slider (between slider and flexure) thereby increasing disk-to-disk spacing and reducing volumetric storage capacity. The present invention has elements placed on the side of the slider without increasing the disk to disk spacing and having no adverse impact on recording density.

The Japanese patent No. 62-287480 disclosed a very unique piezoelectric microactuator arrangement. This reference discloses the placement of piezoelectric microactuators at 1 to 4 corners of the slider or perpendicular to a side of the slider. This approach requires a large space near the head and is not suitable for disk drive suspension application since it significantly reduces disk recordable area because of the large in plane space requirement. The Japanese patent No. 6-150596 discloses the installation of the piezoelectric element inside a cavity in the slider. In this approach, the slider effective thickness is reduces, which will result in higher slider distortion problems. To compensate for the reduction in the slider effective thickness, the slider must be made thicker. The thicker slider results in a higher disk-to-disk spacing. U.S. Pat. No. 4,583,135 shows helical scanning VTR tracking device that utilizes thickness extension mode (d33) of the piezoelectric element. This approach requires many pieces of piezoelectric elements to achieve desired stroke. The additional piezoelectric elements would increase the mass of the overall structure. The increased mass of the overall structure degrades the dynamic performance, while requiring additional space. The additional space results in reduction in the data recording area.

Designs with piezoelectric elements on the leading edge of the slider have small stroke, are limited in track misregistration correction and are expensive to manufacture. Designs with piezoelectric microactuators mounted in the same plane and near the slider have more complex mechanisms like a cradle, are more fragile, excite more undesirable dynamic modes and are more expensive to manufacture.

SUMMARY OF THE INVENTION

The present invention relates to piezoelectric microactuator locations near the slider and in the same plane as slider, and differs from others with location in between slider and flexure, for not adding to the slider thickness and disk-to-disk spacing that reduces drives volumetric storage capacity. This invention also provides an alternate U-shape piezoelectric microactuator element placed in the same plane and around the slider for increased placement accuracy, better dynamics, and increased head movement that is not seen in the prior art.

In one embodiment, the present invention utilizes two rectangular shaped piezoelectric elements placed on the two sides of the slider with ends of both elements attached to the fixed and movable parts of a T-shaped flexure that in turn is attached to a load beam that is fixed. The piezoelectric elements are polarized in opposite direction, such that when a voltage is applied to their top and bottom surfaces, one of the two piezoelectric elements expands and the other contacts, resulting in off-track rotary motion of the slider and head transducer attached to the slider. The rotary motion results in off-track motion that is used by drive servo system to help position the head accurately and fast, and make real time correction, as the head tends to move off track due to disturbances caused by external and internal vibrations. The two piezoelectric elements can also be connected at flexure end to make a single U-shape element for ease of assembly and accurate positioning. The two sides of the U-shape piezoelectric elements are polarized in either the opposite or same direction. The opposite polarization produces a rotary motion, while the same direction polarization produces translatory motion of the slider. Both motions result in across-track motion of the head transducer when the voltage is applied to the top and bottom surfaces of the U-shape piezoelectric element.

Briefly stated then, a fundamental provision of the present invention is defined as follows:

a disk drive system having an actuator arm to support a slider carrying a transducing head adjacent a selected data track of a rotatable disk having a plurality of concentric data tracks, the slider having an air-bearing surface generally parallel to and confronting the top surface of the rotatable disk, wherein a microactuator device effects fine positioning of the transducing head with respect to the selected data track, the microactuator device comprising the slider carrying a transducer head; a T shape flexure member with a fixed and moving end and attached to load beam; and two oppositely polarized rectangular piezoelectric elements having opposite ends, wherein these ends are attached to fixed and moving ends of the flexure. Application of voltage to the top and bottom of the piezoelectric elements, resulting in rotary movement of the slider carrying the head transducer to enable fast and accurate tracking of the data on a high density disk. Alternately, the two piezoelectric elements can be attached together on the fixed side of the flexure to make a single U-shape element for high positioning accuracy and ease of placement. The piezoelectric elements could be made of multiple layers of piezoelectric material to increase head transducer movement, recording density and reduce settle time during track seek.

The foregoing and still further objects and advantages of the present invention will be more apparent from the following detailed explanation of the preferred embodiments of the invention in connection with the accompanying drawing.

DESCRIPTION OF THE PREFERRED EMBODIMENTS

In order to appreciate the context of the present invention, i.e., the disk drive system into which the present microactuator device is incorporated, reference may be made to FIG. 8 of the aforementioned U.S. Pat. No. 6,166,890. It will be seen therein that suitable controls enable both gross and fine resolutions of the actuator arm and the transducer head movements respectively with respect to the rotating disks for track selection.

Figure 1:
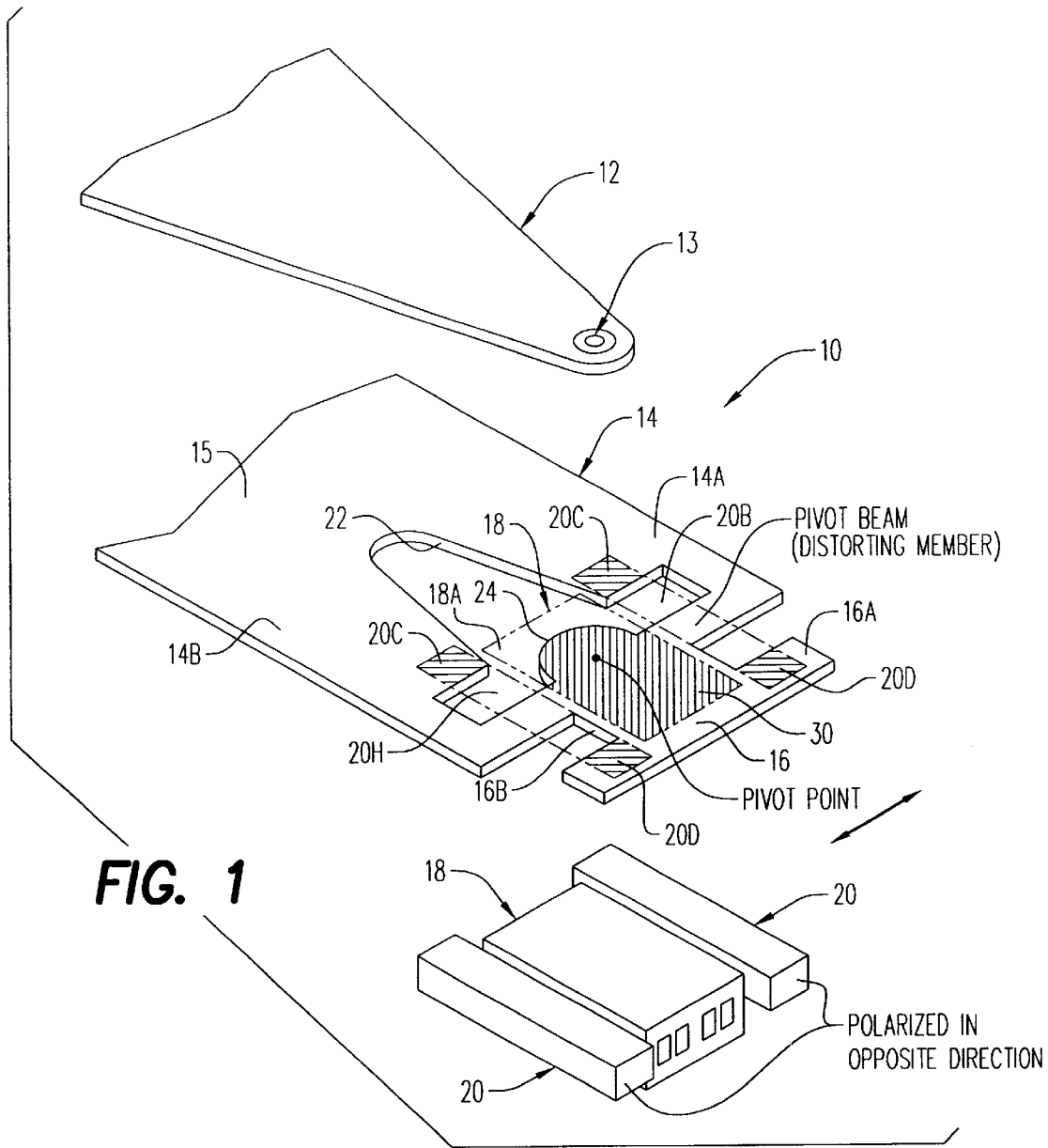
FIG. 1 is an exploded perspective view of the microactuator mechanism in accordance with the first embodiment of the invention.
Figure 2:
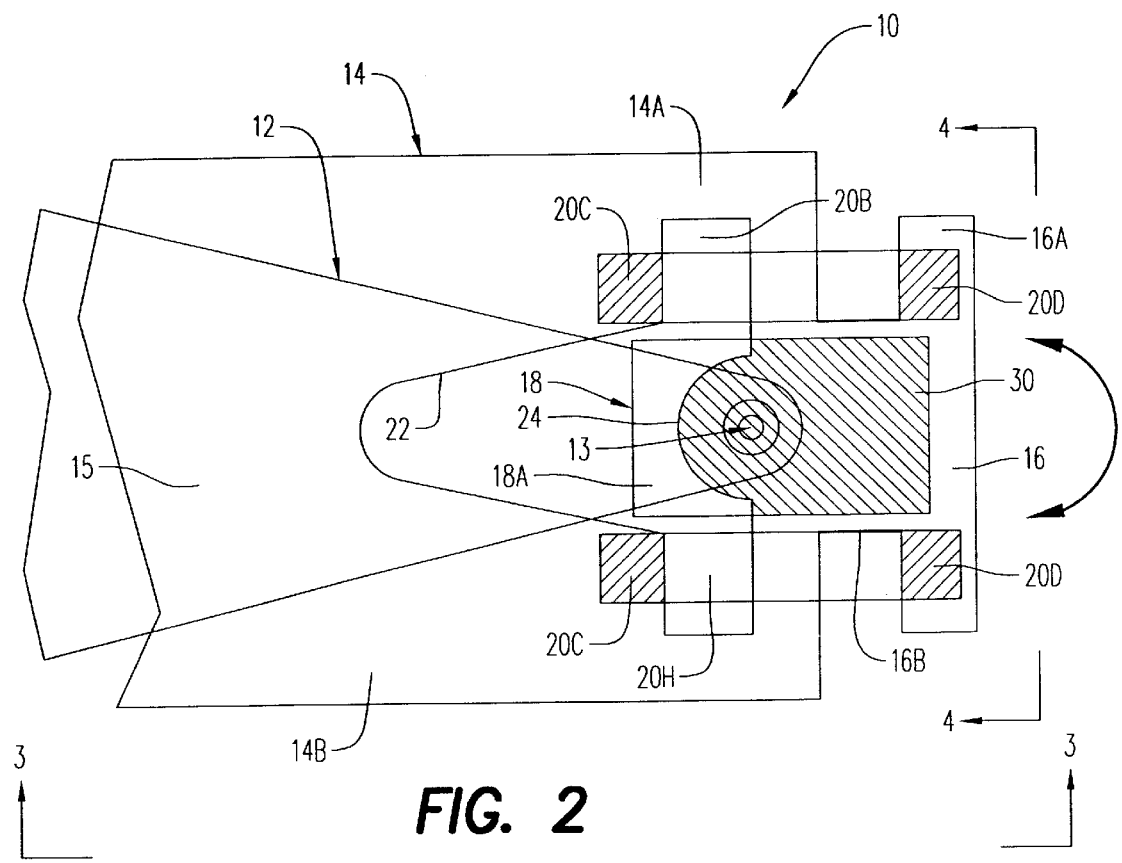
FIG. 2 is a top plan view of the microactuator mechanisms seen in FIG. 1.

Referring now to FIG. 1, a microactuator device 10 consists of a T-shaped flexure member 14 with one fixed end 15 that could be welded to the load beam 12 and the other "moving end" 16 is attached to the slider. The T-shape flexure moving end, a laterally extending oblong portion 16A and a longitudinally extending portion 16B.

Figure 3:
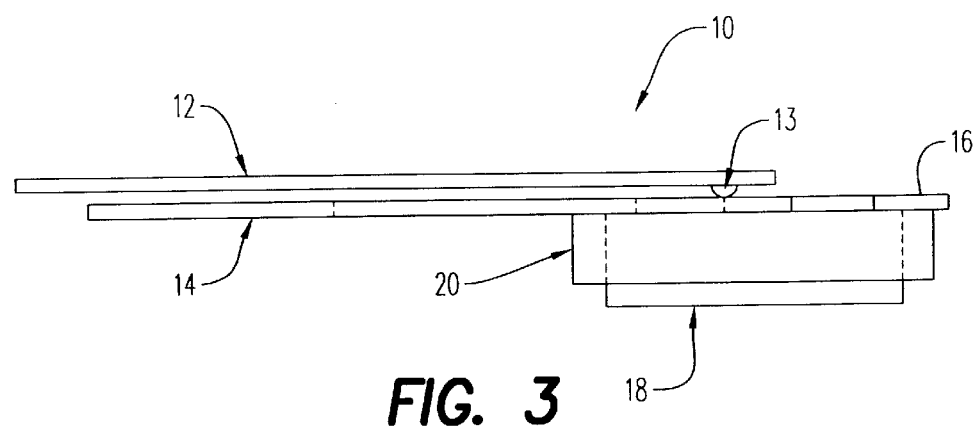
FIG. 3 is a view taken on the line 3—3 of FIG. 2.
Figure 4:
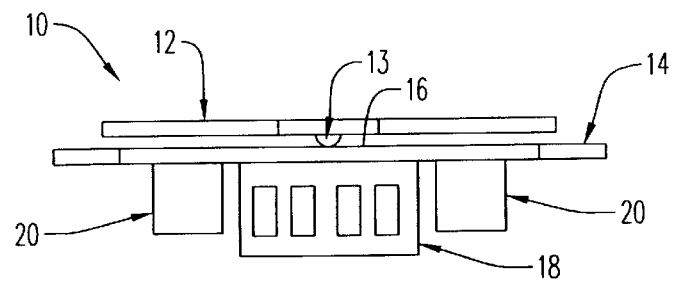
FIG. 4 is a view taken on the line 4—4 of FIG. 2.

Pair of piezoelectric elements 20 extend on either side in closely spaced relationship with the slider 18 and preferably parallel thereto. It will be seen in FIG. 3 that the piezoelectric element thickness is lower than the thickness of the slider so as not to touch and scratch the disk. Although two piezoelectric elements 20 are shown in this embodiment, a single rectangular or oblong-shaped piezoelectric element may be similarly attached.

For the purpose of providing flexibility for the flexure member 14, an opening 22 is formed in the flexure member, thus dividing the flexure member into two legs, 14A and 14B. A tongue 24 is formed as part of the flexure member 14 to provide increased bonding area for the slider 18, which is attached to the flexure by a suitable bonding material 30. The flexure configuration also provides suitable bonding areas 20C and 20D for PZTs and a beam-like member 25 midway between these bonding areas. The center of beam member 25 is the center of slider as well as center of rotation. One of a given piezoelectric element is attached to the "moving end" 16 of the flexure member (bonding area 20D) and the other end of the piezoelectric element is attached to the bonding area 20C.

Accordingly, it will now be understood that the slider 18 is bonded, as shown, to the pivotable portion of the flexure tongue 24. However, this can be also accomplished at any other optimum location but, as shown in FIG. 1, the dimple 13 on the load beam 12 is designed to be on the center line shown and it impinges against the flexure tongue 24, thereby providing a pre-load force to the slider 18 as is desired.

It will be appreciated by those skilled in the art that for wired version suspensions, the power to the piezoelectric elements can be supplied by connecting a power carrying wire to the top surface of both piezoelectric element. The bottom surface of the piezoelectric element can be grounded by conductive adhesive to the flexure steel to serve as a return path to complete electrical circuit. For integrated lead suspensions, a copper pad can be provided on the flexure tongue to connect a wire connecting top surface of both piezoelectric elements to the copper traces of the integrated lead suspension.

Figure 5:
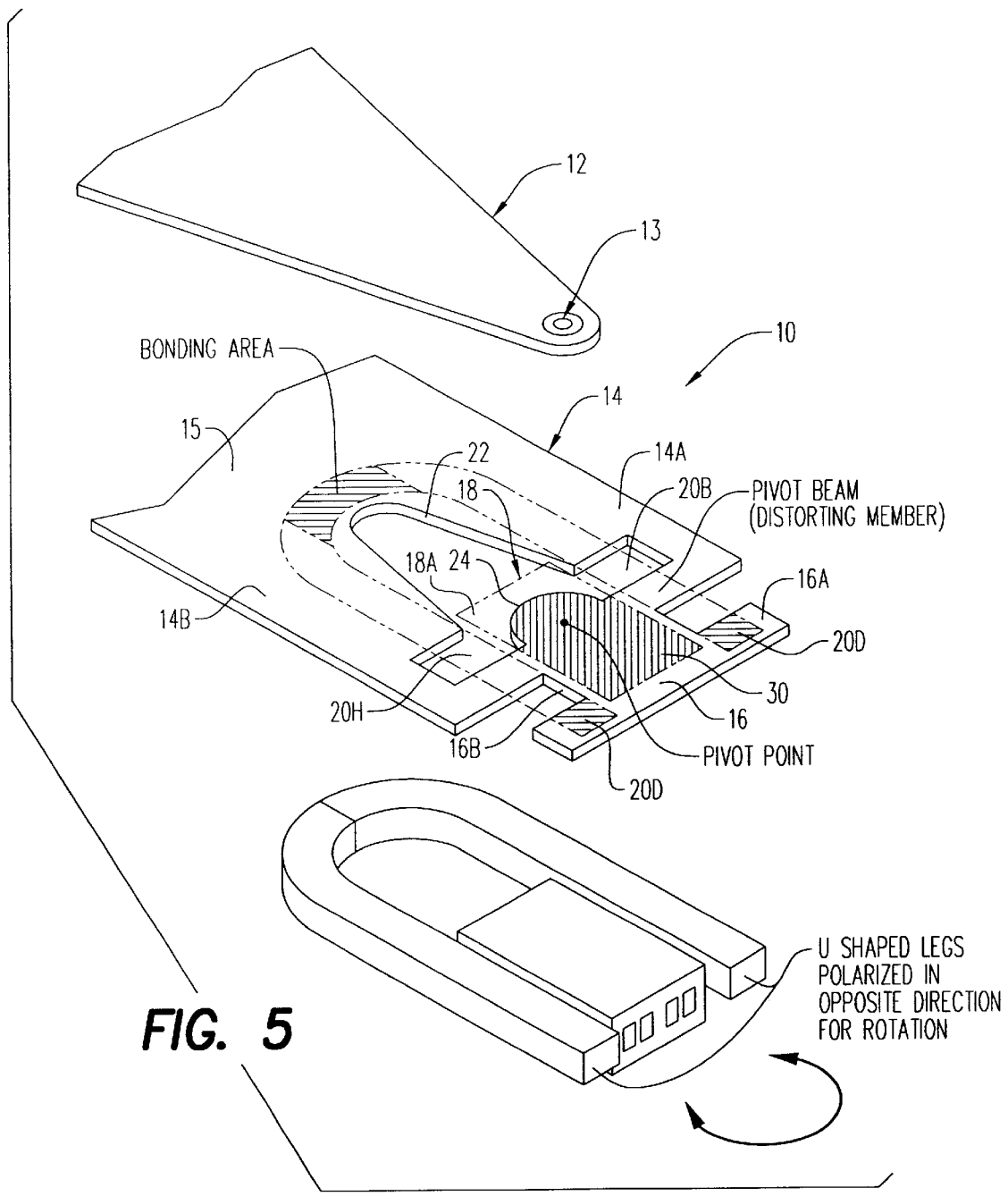
FIG. 5 is an exploded perspective view of the microactuator mechanism in accordance with the second embodiment of the present invention.

It should be noted that the two piezoelectric elements can be angled or connected together like a U, as shown in FIG. 5, to have a single attachment point for ease of handling and assembly, and also if space limitations exist. The two legs of U-shape piezoelectric microactuators 21 and 22, are polarized in opposite direction such that for the same applied voltage, one leg contracts and while other leg expands. Increased length of piezoelectric microactuators or U legs shall increase microactuator stroke. An application of voltage contracts one leg while expanding other and as a result the slider head transducer moves in the direction of the leg that contracts. Reversing the polarity of the applied voltage shall reverse the direction of motion of the transducer.

In order to further increase a transducer head movement per volt, the piezoelectric elements can be made longer, even extending beyond the leading edge of the slider 18 as shown in FIG. 1, and they can be attached to the flexure or load beam. In this case the stroke will be larger due to increased length, and capability of the microactuator shall be increased for off-track error correction resulting in increased recording density and shorter track seek time.

It will be understood from the description herewith presented for the structure and operation of the microactuator of the present invention that this arrangement differs from prior art that offer slider microactuation by piezoelectric elements placed under the slider that result in adding the thickness of piezoelectric material to disk to disk spacing resulting in reduced volumetric storage capacity of the drive. This is not true of the present invention as it places the piezoelectric elements that are lower in thickness than slider on the sides of the slider and not underneath. Also, thickness of the piezoelectric elements can be reduced accordingly as the slider thickness reduces, resulting in no impact to disk-to-disk spacing and volumetric storage capacity of the drive.

In addition, the scheme of the present invention provides a simpler path for connecting piezoelectric elements to the power supply. Such approach provides a more robust connection that could survive the manufacturing processes and withstand severe drive environments.

The invention having been thus described with particular reference to the preferred forms thereof, it will be obvious that various changes and modifications may be made therein without departing from the spirit and scope of the invention as defined in the appended claims.

We claim:

1. A disk drive secondary actuating system having a flexure with fixed and movable end portions, a slider carrying a head transducer, a microactuator device for effecting fine positioning of the head transducer; the microactuator device comprising:

a piezoelectric element positioned adjacent to one side of the slider, and substantially coextensive with the slider, the piezoelectric element having its two ends attached respectively to the moving and stationary end portions of the flexure.

2. A system as defined in claim 1, in which the leading edge of the piezoelectric element extends beyond the leading edge of the slider.

3. A system as defined in claim 1, further comprising a second piezoelectric element positioned adjacent to the other side of the slider and polarized in opposite direction to the first to double slider movement.

4. A system as defined in claim 3, in which the first and second piezoelectric elements are formed as a single U-shaped element with both legs polarized in the same direction for increased actuation force and translatory motion of the head, and for ease of assembly, increased placement accuracy and symmetrical loading, the direction of translation being dependent on whether the applied voltage is positive or negative.

5. A system as defined in claim 1, in which the piezoelectric element includes two legs polarized in opposite directions at the center line of which a voltage is applied, thereby bending the two legs of the element so as to produce slider rotation, the direction of rotation being dependent on whether the applied voltage is positive or negative.

6. A system as defined in claim 4, in which the piezoelectric elements extend beyond the leading edge of the slider and are attached to either movable end portion of the flexure, the movable end portions of the flexure being capable of pivoting away from the slider.

7. A microactuator device for effecting fine positioning of a head transducer with respect to the selected track on a disk, the microactuator comprising:

a piezoelectric element positioned adjacent to one side of, and substantially coextensive with a slider, the piezoelectric element having its two ends attached to respective moving and stationary end portions of a flexure.

8. A microactuator device as defined in claim 7, in which the leading edge of the piezoelectric element extends beyond the leading edge of the slider.

9. A microactuator as defined in claim 7, further comprising a second piezoelectric element positioned adjacent to the other side of the slider.

10. A microactuator as defined in claim 9, in which the first and second piezoelectric elements are formed as a single U-shaped element having two stationary legs thereof being polarized in the same direction for increased actuation force and translatory motion of the head, and for ease of assembly, increased placement accuracy and symmetrical loading, the direction of translation being dependent on whether the applied voltage is positive or negative.

11. A microactuator device as defined in claim 10, in which the piezoelectric elements extend beyond the leading edge of the slider and are attached to either stationary leg of the flexure, the flexure being capable of pivoting away from the slider.

12. A microactuator device as defined in claim 7, in which the piezoelectric element includes two legs polarized in opposite directions at the center line of which a voltage is applied, thereby in bending the two legs of the element so as to produce slider rotation, the direction of rotation being dependent on whether the applied voltage is positive or negative.

* * * * *